Sept. 19, 1967  N. S. STRAND  3,342,729
PERMEABILITY SEPARATORY CELL AND APPARATUS
AND METHOD OF USING THE SAME
Filed Dec. 9, 1964  3 Sheets-Sheet 1
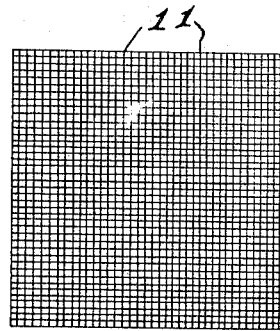
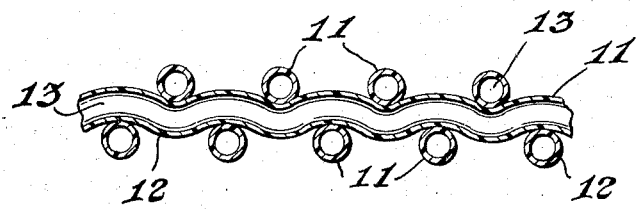
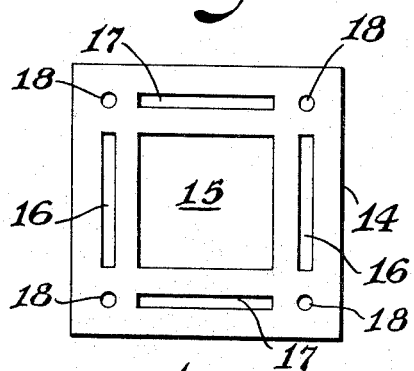
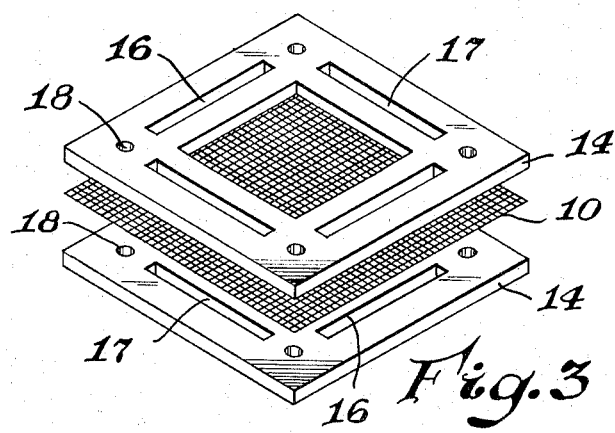
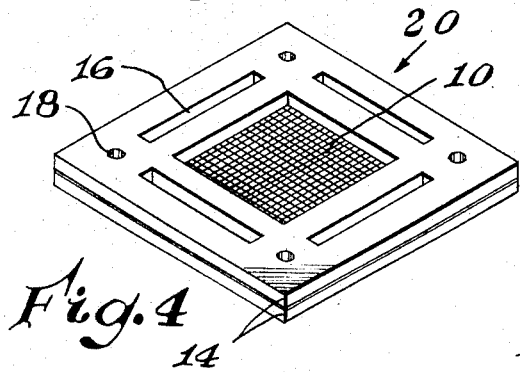
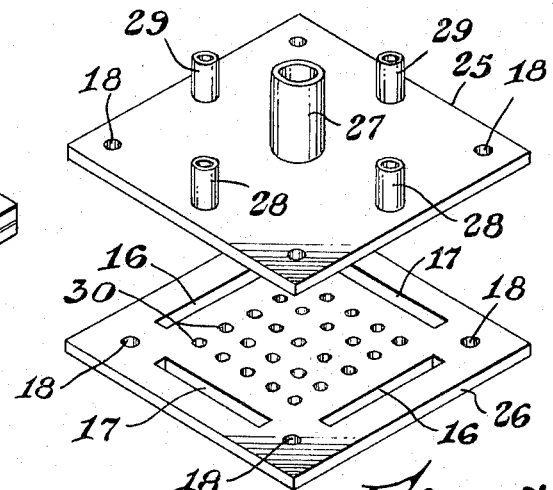
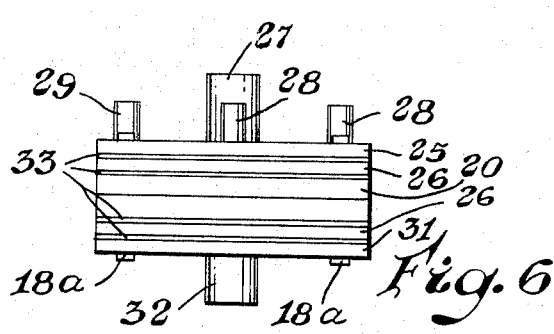
INVENTOR.
Norman S. Strand
BY
ATTORNEY
AGENT Sept. 19, 1967 N. S. STRAND 3,342,729
PERMEABILITY SEPARATORY CELL AND APPARATUS
AND METHOD OF USING THE SAME
Filed Dec. 9, 1964 3 Sheets-Sheet 3

OSMOTIC CELL

OSMOTIC CELL

WATER SOFTENER

WATER SOFTENER

MIXED BED DEMINERALIZER

MIXED BED DEMINERALIZER

INVENTOR.
Norman S. Strand
BY
ATTORNEY
AGENT

United States Patent Office 3,342,729
Patented Sept. 19, 1967

3,342,729
PERMEABILITY SEPARATORY CELL AND APPARATUS AND METHOD OF USING THE SAME
Norman S. Strand, Midland, Mich., assignor to The Dow Chemical Company, Midland, Mich., a corporation of Delaware
Filed Dec. 9, 1964, Ser. No. 417,153
18 Claims. (Cl. 210—23)

The present invention relates to an improved and particularly efficient and effective permeability separatory apparatus. It also relates to a process involving the use of such apparatus in selectively separating the components of multi-component fluids. More specifically, this invention relates to such apparatus comprising a plurality of hollow fibers of a selectively permeable membrane.

A diversity of membranes are known which, to various degrees, have the property of being selectively permeable to different components of fluid mixtures. Thus, some membranes will pass water while restraining ions. Other membranes will selectively pass ions in solution. Still other membranes possess selective permeation rates for two or more non-ionic components of fluid mixtures. Additional types of membranes are the so-called molecular sieve type, such as those utilized for dialysis. These can oftentimes pass ions or other materials but tend to restrain passage of high molecular weight components or are adapted to pass only certain molecular weight fractions of given materials, depending on actual molecular size and proportions thereof.

Reverse osmosis, or ultrafiltration, is one of the most practical applications of permeability separation. For example, when a solution is passed on one side of an osmotic membrane and the corresponding solvent is placed on the other side of the membrane, the solvent will pass through the membrane into the solution. The force causing this transfer varies with the character and concentration of the solution involved. This force is known as the specific osmotic pressure for that solution.

When a pressure differential is applied to the solution (opposed to any pressure that may be exerted on the solvent side of the membrane and in excess of the specific osmotic pressure of the system) a "reverse osmosis" or ultrafiltration is effected. In such cases, solvent from the solution is forced through the membrane while the ions are restrained from passing therethrough. When a membrane material is used that is appropriate for selective permeability of such fluids, the reverse osmosis process functions at or above the prescribed pressure for almost all fluids.

The rate of flow of liquid through a membrane can be calculated by the formula:

Rate = PC × Area × pressure differential
       − osmotic pressure ÷ membrane thickness In the above equation, PC represents the permeability constant which has avalue depending on the material used in the membrane, as well as on the component to be separated. The particular membrane material is selected according to appropriateness of various factors involved. Various suitable membrane materials are hereinafter more fully disclosed.

Substantial pressures are generally required to produce reverse osmosis. For most commercial aqueous ionic solutions, at least one hundred pounds per square inch (100 p.s.i.) is required. Since the rate of mass transfer is directly related to pressure differential, the efficient range of reverse osmosis usually requires pressures of many hundreds of pounds per square inch.

Despite the inherent advantages of separation systems used in permeable membranes, there has been only a very limited adoption of such devices on a commercial scale or, for that matter, to any great extent for any purpose whatever. This has been due mainly to the relatively inefficient rate of transfer of the desired components from one side of the membrane to the other.

Contributing greatly to the inefficiency of the generally known of the presently described type of devices is the particular design of the membrane system in which the separation is effected. If flat sheets of a permeable membrane are used, they ordinarily must be supported against the forces exerted on them by the pressure differential required to effect permeation. The area of the membrane through which the desired component can flow is, accordingly, limited to those regions where fluid egress finds no interference from the supporting structure.

Commercial use of permeability membranes has been directed primarily to thin, uniplanar membranes which are rigidly supported on grooved, perforated or porous backing members. Obviously, in such an arrangement, a membrane sheet of exceedingly large area or a plurality of such sheets are necessary in order to achieve any practical results. In such installations, "dead" areas that actually constitute portions which are unavailable for permeation result. These areas result in the spaces where the membranes are pressed against the backing plates in the apparatus. Consequently, the "free" area available for permeation is reduced in accordance with the total "dead" area required for supporting the membrane.

The use of hollow fibers of such membrane material has the advantage that the membrane supports itself against pressures applied on the inside or outside of the fiber. However, in assembling pluralities of fibers to give sufficient total membrane areas through which the flow can be conducted, various arrangements of bundles of fibers can decrease the total permeation rate by virtue of the fact that, where adjacent fibers are in contact with each other, egress or ingress of fluid is impeded. Moreover, such contact and proximity interferes with the rate of flow of fluid on the outside of the hollow fibers and interferes with contact of fluids passing over the outside of the fibers so that the fibers in the inner regions of the bundle tend to become starved from the externally contacting fluid. Also, the relative positions of fibers to each other in parallel bundle arrangements, which are rather loosely held in the region between the headers, may shift during construction or use of the system. Thus, positioning of the fibers to attain the greatest exposure of unimpeded areas cannot be assured.

Moreover, when the various arrangements of bundles of hollow fibers are utilized, including bundles of parallel aligned fibers and bundles of wound or wrapped fibers, difficult problems are often encountered in sealing the fibers to the header ends, and often the fibers wick the sealant up the bundle which renders some of the surface area of the fibers unaccessible to fluid contact. A further difficulty attendant hollow fiber bundle arrangements in permeability separatory apparatus is that if a rupture of a fiber resulting in leakage should occur, not only is it difficult to detect which fibers are involved, but it is frequently impractical to seal or repair it without damaging or partially destroying the cell, particularly where wrapped or wound bundles are employed. Cleaning of hollow fiber bundle arrangements after usage is also a problem for much the same reasons outlined before as regards such arrangements. That is, it is often difficult to fully and adequately contact all of the surfaces of the interior fibers in the bundle. Adequate cleaning can be a serious problem if the same cell or apparatus is to be used for several different materials separations in order to avoid contamination. Particular problems may become apparent when foodstuffs are being purified, concentrated or the like. If after such employment the cell is allowed to stand, the food particles may sour, decay or rot leading to calibrating bacteria and mold growth.

Accordingly, it is the chief object and primary concern of the present invention to provide a novel separatory device utilizing fine, hollow fibers having utmost utility which overcomes the deficiencies and disadvantages of the heretofore known techniques and procedures in this separatory art.

Briefly described, the present invention takes advantage of the efficacious features of hollow fiber membranes by means of a highly efficient arrangement of the fibers in the form of a separatory cell. This cell is comprised of a relative flat mesh-like membrane of a plurality of woven or interlaced fine, filamentary hollow fibers, much like a fabric. The network usually involves a plurality of the fibers running essentially perpendicular to a plurality of others. The edges of the mesh membrane are sealed in a frame with the ends of the fibers, which are open, terminating in openings around the side of the frame and separated from the central opening. One fluid can be passed through the central opening and over the outside of the fibers. Usually, a second fluid is then passed through the openings around the side of the frame, which fluid traverses through the hollow cores of the fibers and the required material transfer takes place through the hollow fiber membrane wall. The material transfer, or more specifically, permeation, can be made to proceed from outside to inside or inside to outside of the fibers, depending on the system. Moreover, it is not always necessary to have two fluids since in some cases, permeation can be made to occur from one side to another without relying on the driving permeation force developed between two different fluids.

More precisely, in accordance with the present invention a permeability separatory cell is provided comprising a frame; a central opening in said frame; an even number and at least four of generally oppositely spaced peripheral openings in said frame; a relatively flat, mesh, separatory membrane comprised of a plurality of individual interlaced, continuously hollow, selectively permeable, fine, filamentary fibers having terminal openings, each of said hollow fibers having a substantially hollow bore therethrough, a substantial number of which are open to fluids at the terminal ends thereof, a substantial number of said fibers lying at an angular relationship with other of said fibers in the plane of said mesh membrane; said mesh membrane being positioned in said frame such as to be at least coextensive with said central opening and said terminal ends of each fiber terminating in a pair of said generally oppositely spaced peripheral openings.

The separatory apparatus of the present invention is provided by coupling the above described separatory cell with an entrance passage to said central openings; an exit passage from said central opening; entrance passages to half of the number of said peripheral openings; exit passages to the other half of the number of said peripheral openings, said other half of said peripheral openings being those that are generally oppositely spaced from the half of said peripheral openings having entrance passages thereto.

The invention will be further delineated in the ensuing description and disclosure taken in conjunction with the accompanying drawings wherein like numerals refer to like parts and materials wheresoever possible and wherein:

FIGURE 1 is a plan view of a mesh membrane of hollow fibers employed in the separatory cell and apparatus of the present invention;

FIGURE 1a is a fragmentary cross-sectional exploded view of the mesh membrane of FIGURE 1;

FIGURE 2 is a plan view of a member of a frame employed in the separatory cell of the present invention;

FIGURE 3 is a perspective view of the relationship of frames of FIGURE 2 and the mesh membrane of FIGURE 1 in the fabrication of a separatory cell of the present invention;

FIGURE 4 is a perspective view of an embodiment of a separatory cell of the present invention;

FIGURE 5 is a perspective view of a header plate and a distributor plate employed in a separatory apparatus of the invention;

FIGURE 6 is a front elevational view of a separatory apparatus of the invention;

Figure 7:
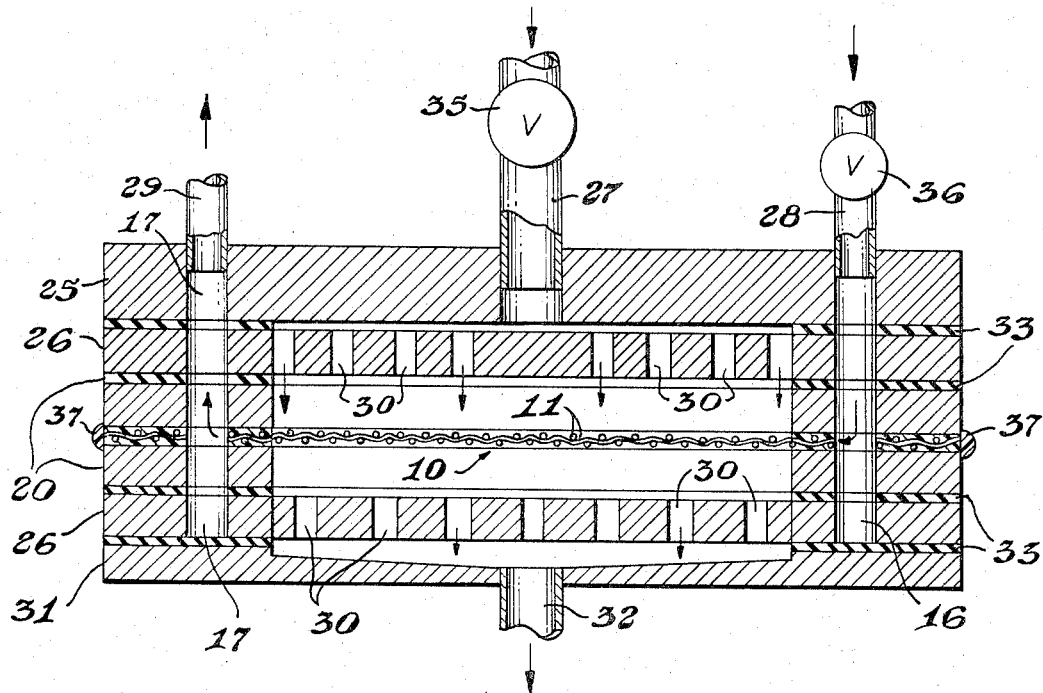
FIGURE 7 shows an elevational view partly in cross-section, of an embodiment of a separatory apparatus of the present invention and means of operation thereof.

Practice of the present invention allows permeability separatory apparatus to be used most advantageously for a wide variety of separations in which great benefit is obtained from installations having exceedingly large transfer areas relative to the volume of space occupied by the apparatus. In such apparatus, a great number of mesh membrane cells can be stacked one above another with very small separations between them (and in some instances one upon another) in a suitable apparatus to develop an extremely large transfer area while being maintained in relatively small spaces.

The present invention further allows for a convenient, expedient and certain sealing of the supported ends of the hollow fibers. Additionally, all of the external fiber surface designed to be contacted by a fluid are readily and fully accessible. For this same reason the cells are easily and adequately cleanable and reusable. Inspection and repair of the fibers in the cell are additionally provided by practice of the invention and are reasonably simple matters.

Moreover, the small diameter hollow fibers used in the cell and apparatus of this invention are able to withstand large pressure differentials in spite of their very thin walls. The different configurations of the prior art require either much thicker materials or backing plates or other types of supports to withstand like encountered pressure differentials.

With reference now to FIGURE 1, there is illustrated a relatively flat mesh separatory membrane, generally referred to by reference numeral 10, of hollow fibers 11. Usually, web or mesh membrane 10 is only one layer thick of hollow fibers 11, although if desired, each of the ribs of the web, which are presently represented by an individual hollow fiber 11, can be a small bundle of hollow fibers. Advantageously, the mesh membrane is made up by interweaving or interlacing the hollow fibers much on the order of a woven fabric. This provides a relatively dimensionally stable membrane, holding the fibers in place. Such woven membranes can be woven on conventional textile weaving equipment including any of the novel or intricate patterns that may be desirably advantageous. Care should be taken, of course, that fiber breakage or thin spots are not created during the fabrication of the web in order to prevent and minimize "leakers" in the membrane.

In FIGURE 1a is shown an exploded view of a fragmentary cross-section of a woven mesh membrane like that illustrated in FIGURE 1. Thus, as shown, fibers 11 are interlaced between one another. Described in textile terms, those fibers in one direction being called the warp and those fibers in a general perpendicular direction to the warp being called the weft. Other means for laying up the webs can be employed including hand lacing or the like. Each of the fibers 11 have a wall 12 and a continuously hollow bore 13 capable of having a fluid pass therethrough. The actual separation of components actually is facilitated by wall 12 which is of a selectively permeable material such as a normally solid synthetic polymeric material that can be extruded into a fine hollow fiber shape.

Various materials can be used for making the permeable continuous hollow fibers suitable for the practice of this invention. Most of these are organic materials, for example polymeric materials such as the acetate, triacetate, propionate, nitrate, etc. esters of cellulose, including the mono-, di-, and tri-esters and mixtures of such esters; cellulose ethers, such as methyl, ethyl, hydroxy-alkyl, carboxy-alkyl, etc. including mixed cellulose ethers; regenerated cellulose; polyvinyl alcohols; polysaccharides; casein and its derivatives; etc. The aforementioned are hydrophilic in character and are more advantageous in the treatment of aqueous fluid compositions.

However, for separation of organic components from fluid mixtures, various hydrophobic materials are particularly suitable, such as: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, and mixtures thereof, methacrylate polymers, styrene polymers, polyolefins, such as polyethylene, polypropylene, etc., and other polyesters, and mixtures of the foregoing. Acrylonitrile polymers, and also certain cellulose derivatives, such as mixed ether-esters, can be modified to make them either hydrophilic or hydrophobic for whichever characteristic is desired in the practice of this invention.

Any of the foregoing materials, as well as other suitable permeable, hollow fiber forming materials including glass, etc. can be utilized according to this invention for selective separation of various fluid components as described herein. Also, the hollow fiber membrane employed may be either inherently suitable or modified so as to make it suitable for ion exchange purposes, and in such case these hollow fibers can be used in the present cells for ion exchange purposes. Exemplary of such ionic exchange materials are those resinous materials containing such groups as carboxylic, sulfonic, phosphonic, amine, quaternary ammonium, mercaptan, enolate, and phenolic groups, such as sulfonated polyethylene, sulfonated polystyrene and the like. One particularly advantageous arrangement than can be employed in the practice of the present invention is a mesh membrane of fibers having cation exchange properties running in one direction (e.g., warp) and fibers having anion exchange properties running in a perpendicular direction (e.g., weft). A mesh membrane of fibers of such materials can thus be employed in the cell and apparatus of the present invention as, for example, a mixed bed continuous water demineralizer.

Hollow fibers suitable for the practice of this invention can be made by techniques known in the art, as taught for example in British Patent 514,638. Advantageously and beneficially, the hollow fibers can be made by the method described in copending application Ser. No. 393,903, filed Sept. 2, 1964. In general, such fibers are spun by melt, dry or wet spinning techniques depending upon the particular fiber-forming materials being used. The spinnerette is selected according to the type of spinning procedure used and the particular dimensions desired in the hollow fiber. For the production of the hollow fiber, the spinnerette has a small annular opening in the orifice through which the spinning composition is extruded.

The hollow fibers employed in mesh membrane are relatively fine filamentary structures. The wall thickness of the fibers is desirably sufficient to withstand the pressure that will be exerted in the subsequent permeability separation utilization of these fibers. Generally, a capability of withstanding pressures of 100 lbs. per sq. in. or more is desired. It is found that the small diameters of these fine hollow fibers permit the self-supporting membrane walls of the fiber to withstand considerable pressures.

It is generally preferred that the outside diameter of the hollow fibers does not exceed 350, advantageously no more than 300 microns. Preferably the outside diameters are in the range of about 10 to about 50 microns. Advantageously, a wall thickness to outside diameter ratio of from about ⅛ to ⅓ is employed in the hollow fibers. Profitably, the wall thickness of the fibers is in the range of about 1 micron to about 80 microns, preferably from about 2 to about 15 microns. Wall thicknesses below this range may result in an inability to withstand the desired pressures, whereas thicknesses above this range increase the resistance to permeation through the fiber wall. Obviously, these characteristics will vary somewhat with the particular material being used and also the particular type of separation involved.

The transfer area of a permeability cell of this invention will vary according to the various dimensions of the hollow fiber, the size of the cell and the total number of fibers in the mesh membrane. The number of fibers employed for a given membrane area will, of course, determine the porosity of the mesh membrane or open area. Generally, a very close weave is employed but not such that excessive pressures are required to force the fluid through the mesh resulting in stretching or otherwise deforming the mesh membrane. A factor to consider in determining the size of the openings between the fibers is the material that is to be treated. For example, if the fluid passed over the mesh membrane is rather pulpy a wider mesh (more open weave) is desirable to avoid plugging whereas, if a non-viscous fluid is involved, such as in water softening, then a much tighter weave can be tolerated.

With reference now to FIGURE 2, there is shown a plan view of one member of a frame 14 suitably designed to be combined with mesh membrane 10 of FIGURE 1. Frame member 14 is provided with a central opening 15, oppositely spaced peripheral openings 16 and oppositely spaced peripheral openings 17, and bolt holes 18.

In FIGURE 3 mesh membrane 10 is shown about to be sandwiched between a pair of frame members 14, and in FIGURE 4 a cell embodiment, generally referred to by reference numeral 20, of the invention is perspectively illustrated, which is the product of combining the illustrated elements of FIGURE 3. When this particular means of fabricating cell 20 is employed, the mesh membrane 20 is generally made slightly larger than frame 14. The sides of frames 14 that are to be sealed to membrane 20 are coated with a suitable adhesive material, such as an epoxy resin, that will securely and permanently bind the members together as well as seal the areas between fibers 11 of membrane 10 so that there is no leakage between the peripheral openings 16, 17 and the central opening 15. Membrane 10 is then sandwiched between frame members 14 in a manner such that the central, peripheral and bolt hole openings of the frame members coincide. After sufficient drying or setting, those portions of mesh membrane 10 spanning peripheral openings 16, 17 are then trimmed out leaving a clear passage through the openings. The excess fibers of the membrane extending past the exterior edge 21 of the frame are trimmed off and the ends of the fibers at edge 21 are sealed with a suitable sealant such as an epoxy resin.

Frame 16 can be made of any suitable material that is relatively inert to the fluid materials to be processed in the cell. For example, it may be of various metals or plastic materials. It is of course to be understood that other configurations of the frame and cell other than square can be employed in practicing the present invention. The frame may be hexagonal, octagonal or circular if desired. In order to take full advantage of the available fiber surface in the mesh membrane, however, at least four peripheral openings, i.e., two pairs of oppositely spaced openings should be employed no matter what the frame configuration. This arrangement permits delivering a fluid to the central bore of the fibers from at least two directions and removal of the fluid from the oppositely spaced exits. The reasons for this are apparent when consideration is taken of the fact that the fibers in the mesh membrane form a criss-cross angular pattern, and usually half of the fibers are perpendicular to the remaining half in the plane of the mesh membrane. The peripheral openings need not necessarily be in the top and bottom of frame 16. Equally satisfactory results can be obtained if the openings are along the edge of the frame coupled with suitable passage openings in a separatory apparatus.

A particularly advantageous and beneficial means for fabricating a cell 20 of the invention is to first extrude or cast the desired frame member from a suitable thermoplastic polymeric material. A mesh membrance can be sandwiched between two such members and the assembly subjected to heat sealing conditions whereby a unitary, integral cell member is provided. This means has the added feature of readily and securely bonding the members into an intimate joined relationship, but additionally avoids the need for any adhesive and sealant material and the attendant setting or drying time. Means can also be provided to simultaneously heat-seal the ends of any fibers protruding beyond the outer edge of the joinder of the two frames by causing the material of the frame to flow over the joinder forming a smooth surfaced seamless edge. Care must be exercised that the hollow fibers are not materially altered in any portion where flow therethrough is desired. The frames can be made in pairs with mating male and female fittings such as lugs and indents to facilitate and assure alignment of the various matching openings. Rapid production of the cells can be achieved by the foregoing means.

Cell 20 can be assembled into any suitable separatory apparatus adapted to take advantage of the two-way flow through the central bore of the fibers of the membrane and/or flow over the exterior of the fibers. One such apparatus is assembled with the aid of the members illustrated in FIGURE 5. Thus, as perspectively illustrated, a header plate 25 and distributor plate 26 can be employed in a separatory apparatus assembly. Header plate 25 is provided with a central part or passage 27 which is so adapted and arranged as to be suitably coupled with means for supplying a fluid thereto and further to guide the fluid to the central opening of a cell like that illustrated in FIGURE 4. Entrance passages 28 are so adapted and arranged as to be suitably coupled to means for supplying a fluid thereto and further to guide the fluid to the peripheral openings of a cell like that illustrated in FIGURE 4. Exit passages 29 which are oppositely spaced from entrance passages 28 are so adapted and arranged as to receive the fluid that has traversed entrance passages 28 and the core of the hollow fiber of the mesh membrane and/or the permeate from the outside of the hollow fibers through the walls of the hollow fibers. Of course, if it is not required or necessary to flow a fluid through the hollow core of the fibers, in which case the hollow cores would serve only to collect the permeate, then entrance passages 28 would actually be employed as exit passages. Bolt holes 18 in header plate 25 are designed to mate with bolt holes 18 in frame member 14.

Distributor plate 26 has a pair of openings 16 and a pair of peripheral openings 17 designed to mate with like numbered openings in frame member 14, bolt holes 18 designed to mate with bolt holes 18 in frame member 14 and header plate 25. When a fluid flows through entrance passage 27 in header plate 25 it becomes distributed before contact with the mesh membrane of the cell by passing through perforations or holes 30 which are generally randomly distributed to prevent channeling of the fluid through the cell. A distributor plate is not essential and the entrance passage itself can be designed as a distributor. It may be desirable to have a distributor plate below the cell to further discourage channeling, and if a multiple of the cells are employed in a single apparatus it may be desirable to intersperse distributor plates every so often between the cells.

A simplified assembled separatory apparatus of the invention is illustrated in FIGURE 6 of the drawings. The top member is a header plate 25, then a distributor plate 26, a cell 20, another distributor plate 26, and followed by a bottom plate 31 equipped with a central exit passage 32 adapted to flow away fluid that has been introduced to the cell through central entrance passage 27. The various members are held together by nuts and bolts 18a. The several members are sealed at the junctures by gaskets 33 around the area outside peripheral openings by a suitable material such as one of the many modified rubbers. Actually, any suitable sealing means can be employed, it being a requirement only that the material chosen be relatively inert to the fluids it will contact and that a good seal is effected. A fully integral cell can be fabricated if desired and if inspection of the mesh membrane is not deemed necessary. For example, the various members can be permanently bonded and sealed with, for example, an epoxy resin or the various members can be constructed of a suitable thermoplastic polymeric material and heat sealed together in the manner described herein with reference to fabricating a cell of the invention.

In FIGURE 7 there is shown a more detailed view, partly in cross-section, of a separatory apparatus of the invention. The assembly comprises a header plate 25 with a central entrance passage 27, equipped with valve 35, a peripheral entrance passage 28, equipped with valve 36, and a peripheral exit passage 29. The ends of hollow fibers 22 at the exterior edge 21 of the junction in cell 20 are shown sealed with an epoxy resin 37 or the like. A fluid is delivered to central passage 27, down over distributor 26, through holes 30 and over mesh membrane 10 of hollow fibers 11, through holes 30 in distributor 26, and the fluid then exits through central exit passage 32 in bottom plate 31. A second fluid, if desired, is flowed through peripheral passage 28, through peripheral openings 16, through the hollow core of fibers 11, whose open terminal ends terminate in opening 16, to peripheral opening 17 and out through peripheral passage 29. Valving means can also be employed on exit passages 29 and 32 to aid in governing the fluid pressures developed in the apparatus. If the apparatus were rotated 90° and a cross section taken through it, a view similar to that of FIGURE 6 would be seen.

Figure 8:
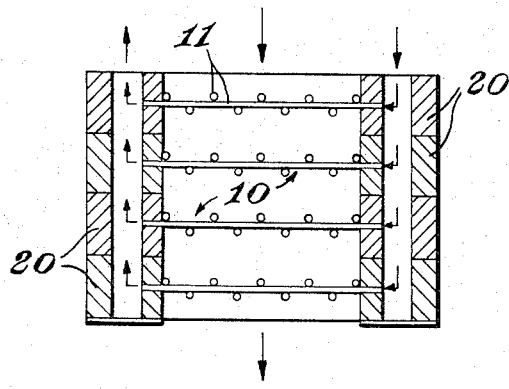
FIGURES 8 and 9 are simplified sectional views, in elevation, showing varied means of operating the separatory apparatus of the invention when several cells are employed.
Figure 9:
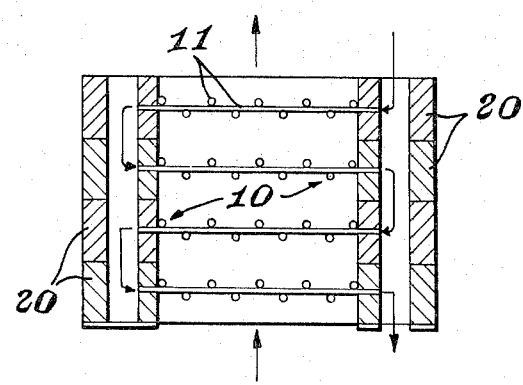

FIGURES 8 and 9 show some of the alternate means for operating a separatory apparatus of the invention when a multiple of cells are employed. Thus, in FIGURE 8 a means is shown whereby one fluid is passed down over the outside of fibers 11 of membrane 10 and the fluid that is to pass through the hollow cores of fibers 11 is delivered to the same side of each cell. In FIGURE 9, as illustrated, the fluid that is to pass through the hollow core of fibers 11 is alternately passed in an opposite direction in each successive cell. When this method is employed it may be advantageous to deliver the fluid over the outside of the fibers, as shown by the directional arrows, in a counter-current direction, although concurrent is equally useful, to the ultimate direction of flow of the fluid in the interior of the fibers. The separatory cells and apparatus can be used in practically any position since, ordinarily, they are run full of fluid.

There are numerous possible variations in the arrangement of a plurality of cells either in series or parallel arrangements or combinations thereof depending on the particular material being treated, the efficiency or degree of separation desired, the volume of fluid to be treated, etc.

The pressures to be applied to the cells or the pressure differential to be used for diffusion or permeation is determined according to the type of fiber material used, the type of fluid or components thereof, permeation rate, osmotic pressure and rate, etc. Generally, however, pressures in the range of from about 10 p.s.i. to about 15,000 p.s.i. are advantageously used.

The permeability separatory cell and apparatus and process of this invention can be used for the recovery or separation of components from various types of fluid mixtures or solutions. The following are typical examples of various commercial recoveries or separations which can be effected by the practice of this invention:

(1) Recovery of water from sea water or brackish water.

(2) Concentration of salts and other chemicals in the various solutions such as NaCl, KCl, KBr, $Na_2CO_3$, $Na_2SO_4$, $Na_2B_4O_7$, $Na_3PO_4$, NaBr, NaF, $CaCl_2$, NaOH, KOH, ammonium and nitrate fertilizers, uranium and other rare salts from leach liquors, $H_3PO_4$, $CuSO_4$, monosodium glutamate, sodium thiosulfate, sodium chromate, sodium chlorate, lithium carbonate, alum, aluminum sulfate, ammonium chloride, ammonium nitrate, heavy water, glycerine, lactic acid, tanning extracts, alcohol, hydrogen fluoride, glycols, etc.

(3) Ion exchange processes, including water softening, anionic softening, recovery of magnesium from sea water, etc.

(4) Separation or concentration of heat sensitive materials, such as in the concentration of natural fruit and vegetable juices, e.g., orange, grapefruit, grape, etc., concentration of sugar solutions, concentration of beverages such as milk and extracts of coffee, tea, etc., and for various medical and pharmaceutical purposes such as in artificial kidneys, treatment of sterile solutions, isolation of virus or bacteria, fractionation of blood, production of serum, the concentration of alkaloids, glucosides, hormones, vitamins, vaccines, amino acids, antisera, antiseptics, proteins, organometallic compounds, antibiotics, etc.

(5) Separation of components which normally azeotrope or boil very closely, separation of ammonia from organic amines, etc.

(6) Processing of industrial waste streams such as waste from radioactive materials, sulfite pulps, fissionable waste, cannery waste, recovery of caustic from viscose solutions, recovery of acids from metal treating processes, etc.

Another field for which the apparatus and process of this invention are adapted is in the separation of components from a gas mixture. For example, hydrogen permeates polystyrene permeable fiber about 22 times as fast as nitrogen and therefore it can easily and very practically be separated from mixtures containing the two gases, for instance, from mixtures such as those produced by the dissociation of ammonia wherein the resultant gas contains about 75 percent hydrogen and 25 percent nitrogen.

Likewise, the separation of hydrogen from mixtures containing carbon dioxide can be effected very practically according to this invention by using polystyrene permeable hollow fibers. Therefore, various commercially available mixtures of this type can be used, such as those produced in the dehydrogenation of ethyl benzene for the production of styrene, in which case hydrogen can be removed by the apparatus and process of this invention and the resultant carbon dioxide-rich residue gas is recycled to the dehydrogenation process. Hydrogen can be similarly separated from other hydrogen-containing gases such as coke oven gas, gases from hydrogenation processes and from petroleum refinery operations.

Also feasible are the gas phase separation of chlorinated methanes from unreacted methane, and the separation of nitrogen from methane to make natural gas more salable. A somewhat related separation is the recovery of oxygen from sea water, in the manner of an artificial gill, whereby sea water passed either inside or outside the hollow fiber effects a permeability separation of the oxygen which permeates the fiber wall. This invention can also be practiced in the separation of oxygen from air, of helium from natural gas, etc.

Figure 10:
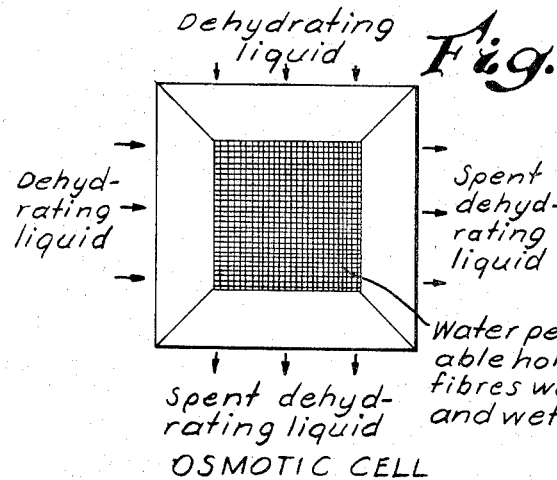
FIGURES 10, 10a, 11, 11a, 12 and 12a are schematic and diagrammatic illustrations showing examples of means of employing the separatory cell and apparatus of the present invention.
Figure 10A:
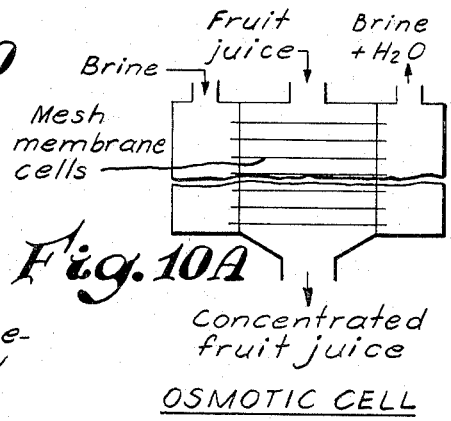

FIGURES 10, 10a and 11, 11a, and 12, 12a illustrate schematically and diagrammatically the operation of a separatory apparatus of the invention for some of the foregoing indicated uses. Thus, in FIGURES 10, 10a, hollow fibers that are permeable to water are employed for concentrating a fruit juice. A dehydrating liquid, such as a brine is fed in two directions through the hollow cores of the fibers in a mesh membrane and the fruit juice (as illustrated in FIGURE 10a) is fed over the mesh membrane on the outside of fibers. A diluted brine (spent dehydrating liquid) is flowed out the opposite ends of the hollow fibers and a concentrated fruit juice is recovered at the bottom of the apparatus.

Figure 11:
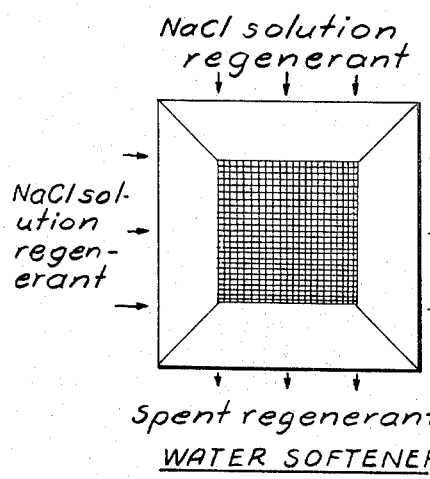
Figure 11A:
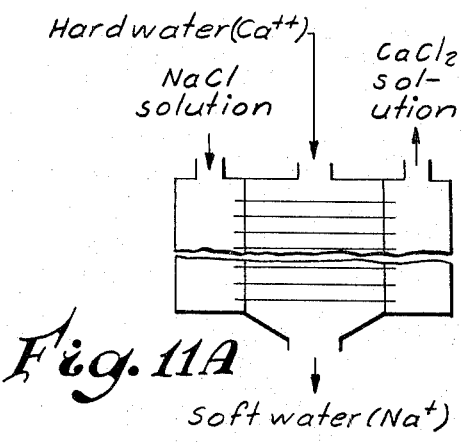
Figure 12:
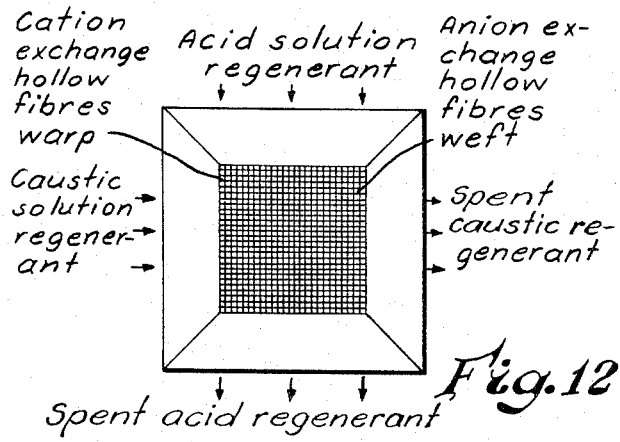
Figure 12A:
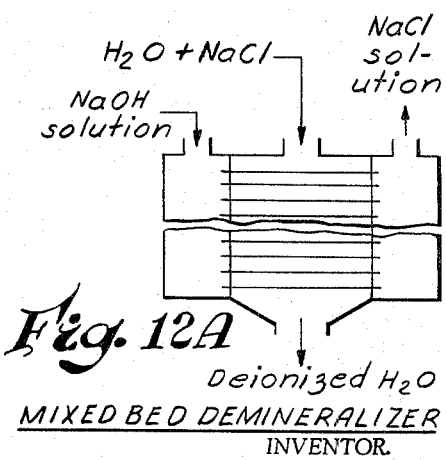

In similar fashion, as illustrated in FIGURES 11, 11a, a water softener is provided using hollow fibers having cation exchange properties, and, as illustrated in FIGURES 12, 12a, a mixed bed demineralizer is provided for deionizing water.

In order to further illustrate the invention, a cell was fabricated having a configuration and following the general procedure discussed with reference to FIGURES 1–7. The hollow fiber mesh membrane was woven from hollow fibers of polyethylene which had been sulfonated with chlorosulfonic acid in order to make the fibers cation exchange membranes. The outside diameter of each hollow fiber was about 210 microns and the inside diameter of each was about 180 microns. The central opening in the frame was about 1 inch square. About 60 hollow fibers running each way were exposed in the central opening. Two such cells were stacked upon each other, separated by rubber gasketing material, and assembled in a separatory apparatus similar to that illustrated in FIGURES 6 and 7.

A dilute brine solution (i.e., an aqueous about 5 percent NaCl solution) was fed through two of the peripheral passages spaced about 90° from each other, which brine passed through the cores of the fibers and exited through exit passages oppositely spaced from the entrance passages. Water, containing about 200 p.p.m. $CaCl_2$ was percolated down through a central passage over the mesh membrane and out through a bottom central passage. The effluent water obtained from the bottom passage is found to be significantly reduced in calcium ions and the effluent water can be made to be completely "soft" with successive cycling through the mesh membrane or by utilizing more cells in series in the separatory apparatus or sequential separatory apparatus.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

What is claimed is:

1. A permeability separatory cell comprising a frame; a central opening in said frame; an even number and at least four of generally oppositely spaced peripheral openings in said frame; a relatively flat, mesh separatory membrane comprised of a plurality of individual, interlaced, continuously hollow, selectively permeable, fine, filamentary fibers having terminal openings, each of said hollow fibers having a substantially hollow bore therethrough, a substantial number of which are open to fluids at the terminal ends thereof, a substantial number of said fibers lying at an angular relationship with other of said fibers in the plane of said mesh membrane; said mesh membrane being positioned in said frame so as to be at least coextensive with said central opening and the opposite terminal ends of each fiber terminating in a pair of said generally oppositely spaced peripheral openings.

2. The separatory cell of claim 1 wherein said hollow fiber has an outside diameter of not more than about 350 microns.

3. The separatory cell of claim 1 wherein said hollow fiber has an outside diameter of from about 10 to about 50 microns.

4. The separatory cell of claim 1 wherein said hollow fiber has a wall thickness of from about 1 to about 50 microns.

5. The separatory cell of claim 1 wherein said hollow fiber has an outside diameter of less than about 350 microns and a wall thickness to outside diameter ratio of from about ⅛ to about ⅓.

6. The separatory cell of claim 1 wherein said hollow fibers are of a synthetic, polymeric water permeable material.

7. The separatory cell of claim 1 wherein said hollow fibers are of a cation exchange material.

8. The separatory cell of claim 1 wherein the hollow fibers that terminate in one pair of said generally oppositely spaced peripheral openings are of a cation exchange material and the hollow fibers that terminate in a different pair of said generally oppositely spaced peripheral openings are of an anion exchange material.

9. A permeability separatory apparatus comprising:
 (a) at least one cell comprised of a frame; a central opening in said frame; an even number and at least four of generally oppositely spaced peripheral openings in said frame; a relatively flat, mesh separatory membrane comprised of a plurality of individual, interlaced, continuously hollow, selectively permeable, fine, filamentary fibers having terminal openings, each of said hollow fibers having a substantially hollow bore therethrough a substantial number of which are open to fluids at the opposite terminal ends thereof, a substantially number of said fibers lying at an angular relationship with other of said fibers in the plane of said mesh membrane; said mesh membrane being positioned in said frame so as to be at least coextensive with said central opening and the opposite terminal ends of each fiber terminating in a pair of said generally oppositely spaced peripheral openings;
 (b) an entrance passage to said central opening;
 (c) an exit passage from said central opening;
 (d) entrance passages to half of the number of said peripheral openings;
 (e) exit passages to the other half of the number of said peripheral openings, said other half of said peripheral openings being oppositely spaced from the half of said peripheral openings having entrance passages thereto; and
 (f) sealing means between said central openings and said peripheral openings.

10. The separatory apparatus of claim 9 wherein said hollow fiber has an outside diameter of not more than about 350 microns.

11. The separatory apparatus of claim 9 wherein said hollow fiber has an outside diameter of from about 10 to about 50 microns.

12. The separatory apparatus of claim 9 wherein said hollow fiber has a wall thickness of from about 1 to about 50 microns.

13. The separatory apparatus of claim 9 wherein said hollow fiber has an outside diameter of less than about 350 microns and a wall thickness to outside diameter ratio of from about ⅛ to about ⅓.

14. The separatory apparatus of claim 9 wherein said hollow fibers are of a synthetic, polymeric water permeable material.

15. The separatory apparatus of claim 9 wherein said hollow fibers are of a cation exchange material.

16. The separatory apparatus of claim 9 wherein said hollow fibers that terminate in one pair of said generally oppositely spaced peripheral openings are of a cation exchange material and the hollow fibers that terminate in a different pair of said generally oppositely spaced peripheral openings are of an anion exchange material.

17. The method for the separation of a component from a fluid having at least one other component therein comprising:
 (a) flowing said fluid essentially perpendicular to the plane of a separatory membrane consisting essentially of a relatively flat, mesh membrane of a plurality of individual, interlaced, continuously hollow, selectively permeable, fine, filamentary fibers having terminal openings, each of said hollow fibers having a substantially hollow bore therethrough;
 (b) collecting that portion of component of said fluid which permeates the wall of said hollow fibers and conducting it away from said mesh membrane through the interior of said fibers in a direction essentially parallel to the plane of said mesh membrane; and
 (c) flowing the non-permeated portion of asid fluid away from said mesh membrane.

18. The method for the separation of a component from a fluid having at least one other component therein comprising:
 (a) flowing said fluid through a plurality of hollow fibers, which hollow fibers are the members of a separatory membrane consisting essentially of a relatively flat, mesh membrane of a plurality of individual, interlaced, continuously hollow, selectively permeable, fine, filamentary fibers having terminal openings, each of said hollow fibers having a substantially hollow bore therethrough, the direction of flow of said fluid through said hollow fibers being essentially parallel to the plane of said mesh membrane;
 (b) collecting that portion of component of said fluid which permeates the wall of said hollow fibers and conducting it away from said mesh membrane in a direction essentially perpendicular to the plane of said mesh membrane; and
 (c) flowing the non-permeated portion of said fluid through the length of said hollow fibers and out the opposite ends thereof.

References Cited

UNITED STATES PATENTS 2,982,416  5/1961  Bell _____ 210—321
3,228,877  1/1966  Mahon _____ 210—22

JOSEPH SCOVRONEK, *Acting Primary Examiner.*

E. G. WHITBY, *Assistant Examiner.*